Oct. 20, 1936.   C. E. SORENSEN ET AL   2,057,794
WELDING MACHINE
Filed April 27, 1934   3 Sheets-Sheet 1
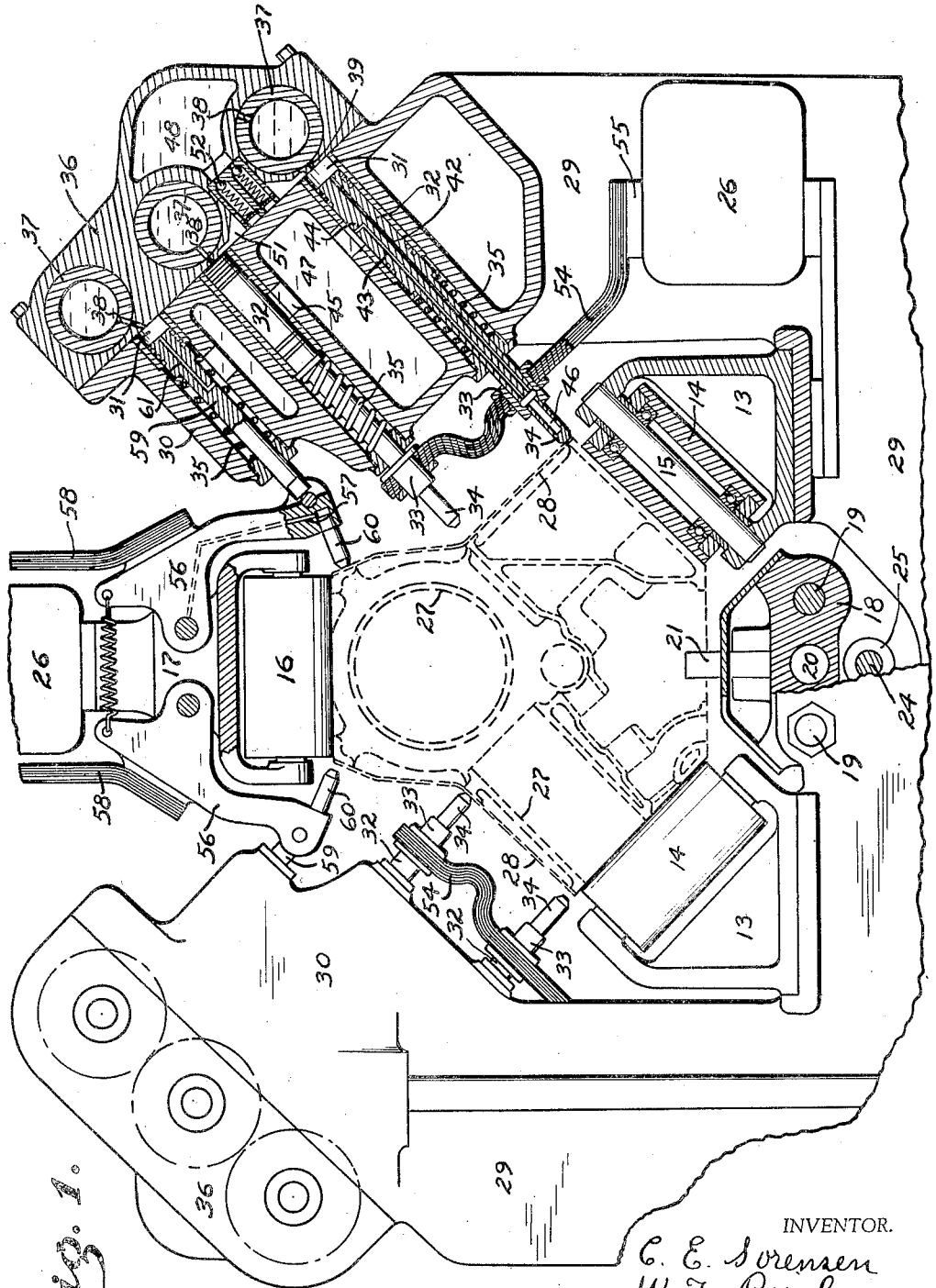
INVENTOR.
C. E. Sorensen
BY W. F. Pioch
ATTORNEY.

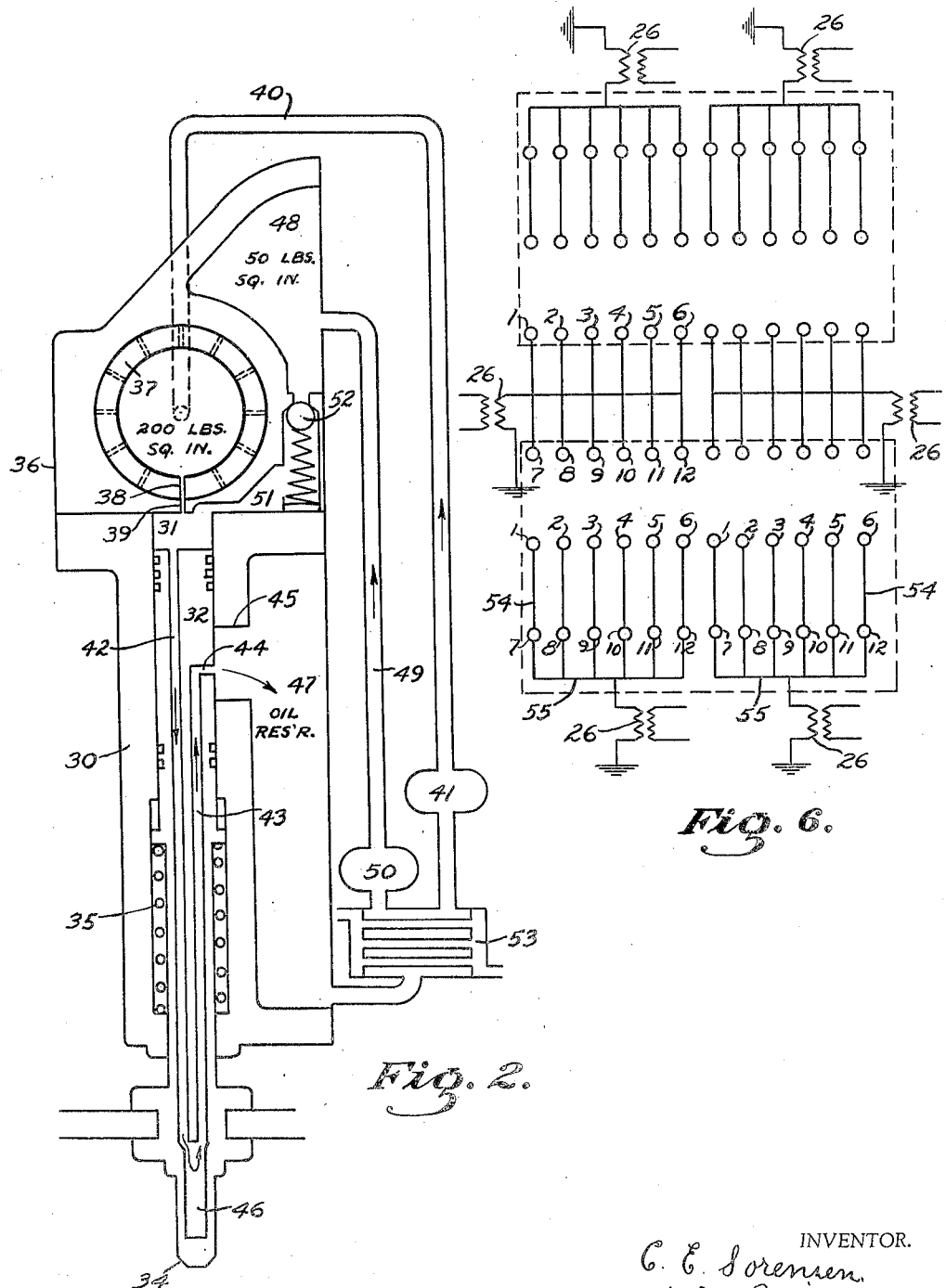

Oct. 20, 1936.  C. E. SORENSEN ET AL  2,057,794
WELDING MACHINE
Filed April 27, 1934   3 Sheets-Sheet 3
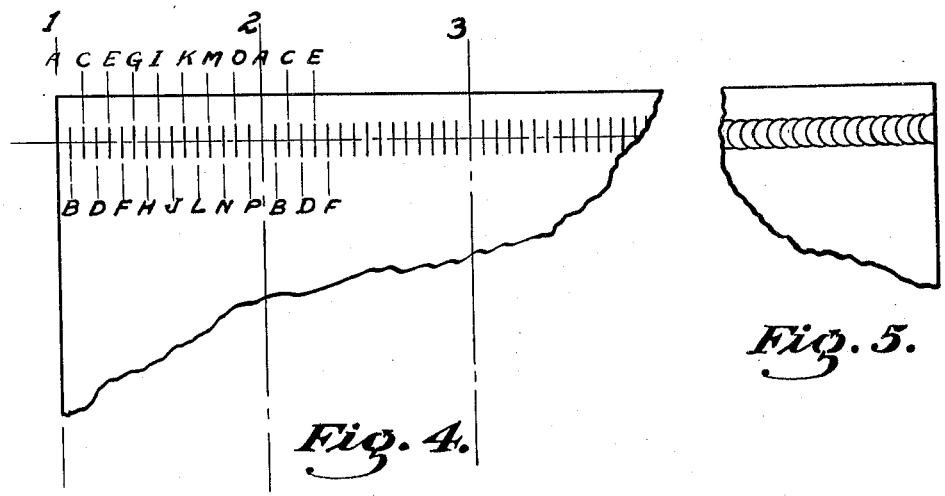
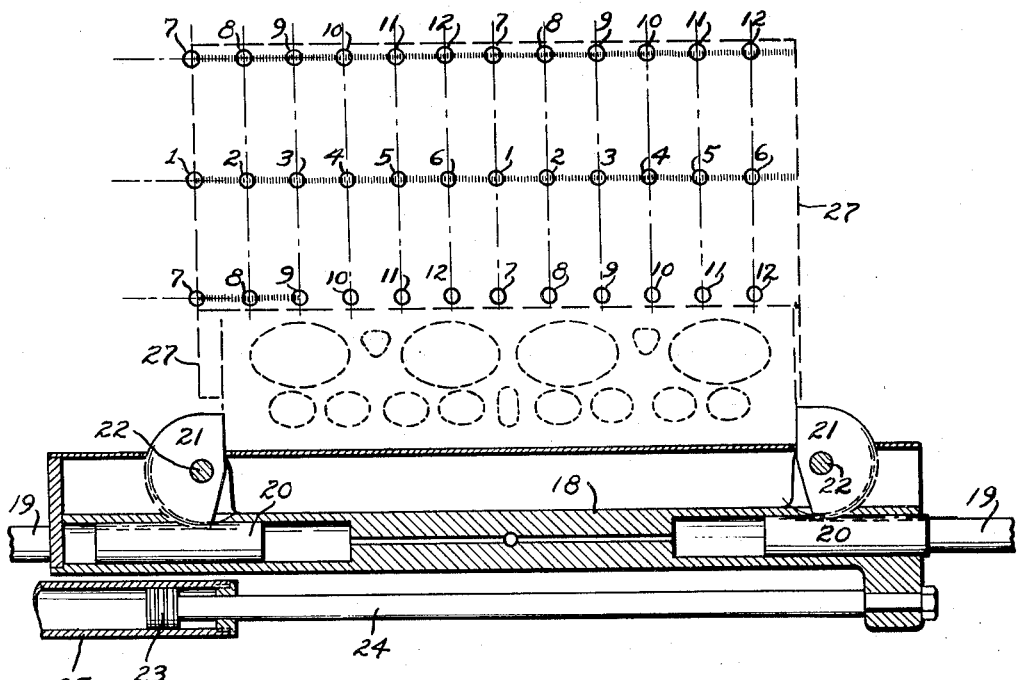
INVENTOR.
C. E. Sorensen.
BY W. F. Proch.
ATTORNEY.

Patented Oct. 20, 1936

2,057,794

UNITED STATES PATENT OFFICE 2,057,794

WELDING MACHINE

Charles E. Sorensen and William F. Pioch, Detroit, Mich., assignors to Ford Motor Company, Dearborn, Mich., a corporation of Delaware Application April 27, 1934, Serial No. 722,690

7 Claims. (Cl. 219—4)

The object of our invention is to provide a method of forming line or seam welds wherein certain serious objections, unavoidable in all other seam welding processes known to the applicants, are eliminated. The electric resistance method of seam welding is referred to herein in contrast to arc or acetylene welding. Heretofore, when it was desirable to seam weld by the electric resisting process, it was customary to run the work to be welded between a pair of rollers, these rollers forming the respective electrodes of a welding machine. For certain classes of work, as for example welding similar sheets of metal together, this type of welding was quite suitable. However, where it was desirable to weld a thin metal sheet to a relatively heavy plate or a cast iron structure, the roller type of machine was unsatisfactory. Apparently, when the thin metal plate is being welded its temperature increases and causes an expansion thereof greater than the expansion of the heavy plate or casting to which it is being welded. This differential expansion causes warping and buckling of the sheet and sets up excessive strains in the sheet and casting after the unit cools.

The unique feature of our improved process, described herein, is that the thin metal sheet is simultaneously spot welded to the casting at a large number of points over its area and then lines joining these points are simultaneously formed by providing rows of overlapping spot welds. This method prevents excessive strains from developing, as it reduces the expansion of the sheet and prevents warping thereof.

In order to accomplish this desirable result, we have provided a relatively large number of electrodes of the conventional spot-welding type, which electrodes successively contact with the sheet which is to be welded, thereby spot welding the sheet to the casting at a relatively large number of points along the line or seam to be welded. The casting is then moved lengthwise a distance equal to about half the diameter of the spot welds and then a new series of spots are made, overlapping the first mentioned series. This cycle is repeated until the rows of overlapping spot welds fill the space between the first mentioned spots, thereby effecting a continuous or line weld.

A further object of our invention is to provide a novel type of electrode operating mechanism which, due to its simplicity, is especially adapted to individually operate the large number of electrodes which are used in this method of welding.

Still a further object of our invention is to provide a welding machine which is capable of welding relatively thin metal sheets to the respective sides of a skeletonized internal-combustion engine cylinder block, which plates form the water jackets and crank case of the motor. The construction of the internal-combustion engine, per se, forms no part of this invention but will briefly be described in order to better bring out the function of our improved machine and the novel steps of our process.

With these and other objects in view, our invention consists in the arrangement, construction and combination of the various parts of our improved device, as described in the specification, claimed in our claims, and illustrated in the accompanying drawings, in which:

Figure 1 shows the front elevation of a machine incorporating our invention, part of the machine being broken away to better illustrate the construction.

Figure 2 is a diagrammatic view illustrating the means of hydraulically moving the electrodes into engagement with the work in timed relation to each other.

Figure 3 is a vertical central sectional view taken through the mechanism for holding the work or cylinder block casting in position and for moving it lengthwise to form the overlapping spot welds.

Figure 4 is a full sized view of a section of the plate to be welded, illustrating the successive positions at which the electrodes operate.

Figure 5 is a full sized view of a portion of the plate after the seam weld is completed, and Figure 6 is a wiring diagram, illustrating the several electrical circuits incorporated in the machine shown.

Referring to Figure 1 of the accompanying drawings, we have shown by dotted lines 27 a V-type eight cylinder motor block casting. It will be noted that this cylinder block casting 27 is formed with the outer sides of each cylinder block exposed, and also with a skeletonized crank case structure so as to materially reduce the weight of the casting. This construction allows for better support of the coring used to form the cylinders. A pair of sheet metal plates, shown by dotted lines 28, are adapted to be welded to the respective sides of the cylinder block, these sheets forming the water jacket and crank case of the motor. In order to so weld the sheets one edge of the sheet is seam welded to the top of the cylinder casting. The center of the sheet is seam welded to the bottom of the cylinder and the bottom edge of the sheet is seam welded to the bottom of the crank case casting, thereby effectively forming a water jacket around the cylinders and completing the enclosure of the crank shaft.

The machine, about to be described, comprises a U-shaped frame member 29 in which the cylinder block to be welded is positioned. The block is mounted in an inverted position; however, the terminology used throughout will designate the top of the cylinder block as being the top thereof when the block is turned to its normal or upright position. The "bottom of the crank case" will also refer to the normal position of the engine even though when the device is being welded this portion is uppermost in the welding machine.

In order to support the cylinder block 27 in the machine a pair of brackets 13 are fixed in the frame 29, each of these brackets having a plurality of rollers 14 rotatably mounted therein upon shafts 15 these rollers being positioned at substantially 45 degrees from the vertical. The angle at which these rollers are positioned should be chosen to uniformly bear on the top of the casting being welded so the casting may be freely advanced into the frame while being held rigidly supported upon the rollers 14. A second series of rollers 16 are fixedly secured upon a bracket 17, which is secured between the upper arms of the U-shaped frame 29. The rollers 16 coact with the bottom or crank case of the motor 27 and prevent the accidental movement of the motor away from the rollers 14.

Means are provided, as shown in Figure 3, for clamping the motor and intermittently feeding it lengthwise into the frame 29. This means comprises a carriage 18 which is reciprocally mounted upon a pair of bars 19, these bars being fixedly secured to respective ends of the frame 29. A pair of plungers 20 are slidably mounted in the front and rear, respectively, of the carriage 18, these plungers each having the gear teeth formed in one side to provide a pair of conventional racks which coact with segment shaped clamping gears 21. These gears are pivotably mounted upon trunnions 22, the latter being fixed to the carriage 18. The clamping mechanism is so arranged that outward movement of the plungers 20 cause the gear members 21 to rotate in opposite directions so that the flat sides of these segment shaped members bear against the respective ends of the cylinder block being welded, thereby rigidly gripping the block and retaining it against longitudinal movement relative to the carriage. Suitable means is provided for operatively applying hydraulic fluid under pressure to the plungers 20, in the conventional manner.

The aforementioned clamping device is adapted to hold the cylinder block rigidly upon the carriage 18; however, means is provided whereby the carriage and cylinder block may be intermittently moved lengthwise upon the bars 19. This means comprises a piston 23 which is secured to one end of a piston rod 24, the opposite end of which is secured to the carriage 18. The piston 23 is adapted to reciprocate in a cylinder 25 so that the application of hydraulic pressure to the head of the piston causes the carriage to slide lengthwise.

To accomplish the actual welding operation, it is only necessary to move the carriage substantially one and a half inches. The travel of the carriage, however, has been designed to provide a movement of about three feet so that the cylinder block may be conveniently loaded onto the carriage outside of the machine and then moved into the machine proper where the welding operation is performed. The loading operation comprises first placing the cylinder block on the rollers 14, then applying hydraulic pressure to the heads of the pistons 20 thereby clamping the block into position, and then applying fluid pressure to piston 23 to thereby move the carriage 18 and cylinder block into the U-shaped frame member. The block is now in position to be acted upon by the welding electrodes of the machine.

Before describing the exact structure of the welding mechanism, it may be well to briefly describe the arrangement of the electrodes therein. The electrodes, which comprise seventy-two in number, are arranged in six rows, three rows being associated with each side of the machine. Each lowermost row of electrodes is adapted to form the seam welds between the plates 28 and the top of each cylinder block. The intermediate rows form the seam welds between the plates and the half bottom of the cylinder blocks, and the upper rows form the welds between the plates and the bottom of the crank case.

Referring to Figure 6, it will be noted that we have provided six welding transformers 26, each of which is adapted to supply welding current to a group of twelve electrodes. To maintain short leads, the first six electrodes in each of the two bottom rows are electrically connected together and to the secondary of one transformer 26, while a second transformer 26 supplies current for the remaining six electrodes in both rows. The first six electrodes in the two upper rows are likewise supplied by one transformer and the remaining electrodes in these two rows are supplied by another transformer. From the foregoing, it will be noted that there are six groups of electrodes, each supplied by a separate transformer, and in the machine shown these six groups simultaneously operate upon the cylinder block. Consequently, to understand the operation of the device, it is believed only necessary to explain the operation of the electrodes in one particular group.

Referring to Figure 6, it will be noted that we have given the individual electrodes in the left hand lowermost group of electrodes the respective numbers 1 through 12, inclusive. Figure 4, which is a full sized view of a portion of the plate to be welded, shows that these electrodes are spaced in rows one and six-tenths inches apart, the electrode positions being designated by lines numbered 1, 2, 3 etc. corresponding to the adjacent electrode. The mechanism adapted to intermittently operate these electrodes is arranged to successively move the number 1 electrode into engagement with the cylinder block to form its spot weld, then number 2 and so on successively until the twelfth electrode has completed its weld. The first welding cycle is accomplished while the cylinder block is in the position shown by letter A, in Figure 4. After the series of welds are completed the cylinder block is moved lengthwise by the piston 23 until the position shown by line B becomes aligned with the electrodes. The aforementioned successive operation or welding cycle of the electrodes is then repeated. The block is then moved successively to positions where D, E, F, G, H, I, J, K, L, M, N, O, and P successively become aligned with the electrodes and the aforementioned welding cycle repeated at each position.

It will be noted that each of the positions A, B, C etc. are spaced one-tenth of an inch apart and inasmuch as the spots welded by the electrodes are approximately one-quarter of an inch in diameter, it is apparent that these spots overlap slightly more than half their diameters so that in effect a continuous seam weld is provided, as shown in Figure 5. As each of the groups of electrodes simultaneously operate, it will also be apparent that it is only necessary to complete the seam welds between each of the original spot welds to thereby form three seam welds which extend the full length of the cylinder block.

The specific apparatus for operating the electrodes comprises a pair of welding heads 30 which are provided on the upper ends of the U-shaped frame member. Each of these welding heads is provided with three rows of piston bores 31, in which suitable electrode pistons 32 are reciprocally mounted. The two lowermost rows of bores 31 are identical and directly operate the two lowermost rows of electrodes, while the upper row of bores 31 have pistons 59 therein which indirectly operate the upper row of electrodes. Inasmuch as the two lowermost rows of bores 31 are each provided with electrode operating pistons therein and as all of these pistons and electrodes are identical, only one of such units will be described herein.

Each of these pistons 32 is provided with a head adjacent to the upper end of its bore 31, the lower portion of the piston extending downwardly where it is fixedly secured to an electrode holder 33, this holder having an electrode 34 affixed therein. A coil spring 35 resiliently urges the piston and electrode upwardly in the bore 31 in a direction away from the work being welded. Consequently, it is only when sufficient fluid pressure is applied to the piston head to overcome the resistance of the spring 35 that the piston moves downwardly so as to engage the electrode with the plate 28.

A novel valve mechanism is provided, as shown in Figure 2, for both reciprocating the electrode piston and for cooling the electrodes. The valves used herein are of the rotary sleeve type, there being only one sleeve provided for each row of pistons. However, individual ports are provided in each sleeve for operating the individual plungers in each row. Each of the sleeves, numbered 37, is rotatably mounted in a head 36 which is fixed to each arm of the frame 29. The sleeves 37 each have an axial bore therein and each is provided with twelve relatively narrow ports 38 which extend through the wall of the sleeve. These ports are uniformly spaced along the axis of the sleeve, one above each piston, and are uniformly spaced angularly around the sleeve. A passageway 39 connects the top of each cylinder bore 31 with its port 38, these passageways being quite narrow but extending axially substantially the diameter of the piston so that the area of each is equivalent to the area of a circular opening having a diameter about four times the width of the passageway.

It will be noted that a conduit 40 extends from a high pressure pump 41 and supplies oil under approximately two hundred pounds pressure per square inch to the bore of the sleeve 37. Consequently, as the sleeve 37 is rotated, each of the ports 38 successively communicates with its passageway 39 so the chamber above the pistons 32 will be successively placed under a fluid pressure of approximately two hundred pounds pressure per square inch. This pressure is sufficient to force the piston downwardly against the pressure of the spring 35.

Referring to Figure 2, it may be seen that each piston 32 is provided with a passageway 42 which extends from the piston head down through the bottom end thereof, while a second opening 43 extends from the bottom end of the piston up to a position spaced a short distance from the piston head, where it is communicated with a transverse opening 44, which opening communicates with an exhaust port 45 which is formed in the side of the bore 31. Each of the electrodes 34 also has an axial opening therein which connects the two openings 42 and 43. Consequently, oil is free at all times to flow through the opening 42 into the bore 46 and then through the opening 43 and out through the opening 44, where it discharges into a suitable oil reservoir 47 which is in communication with the exhaust port 45. The passageways 42 and 43, however, have a much smaller cross sectional area than the area of the ports 38 or passageways 39 so that when high pressure oil is conducted from the port 39 the piston is moved downwardly against the action of the spring 35 in spite of the flow of oil through the openings 42 and 43. However, when the valve 38 closes, then the spring 35 is sufficient to force the piston upwardly, thereby discharging the oil which is above the piston head into the oil reservoir 47.

From the foregoing, it will be seen that rotation of the sleeve 37 will successively move the plungers 32 downwardly once for each revolution thereof and that the piston will be returned at the end of each downward movement, due to the flow of the oil through the ports 42 and 44. It will further be noted that the electrodes 34 are to some extent cooled by the oil flowing therethrough. However, the amount of oil flowing through the ports 38 is quite small, as each port is closed to its piston during about ninety-seven per cent of the cycle. Other means are therefore provided for effectively cooling the electrodes during the remaining time. To accomplish this we have provided a chamber 48 in the head 36 which chamber is maintained under a fluid pressure of about fifty pounds per square inch by means of a conduit 49 which is in communication with a low pressure pump 50. The chamber 48 is in communication with the bore 31 by means of a passageway 51 and a check valve 52 is interposed between the passageway 51 and the chamber 48 so that oil will normally flow from the chamber 48 through the check valve 52 into the piston bore 31. In order that the piston 32 may not be moved downwardly by the constant flow of oil, the spring 35 is designed so that the pressure of fifty pounds per square inch will not compress it. However, even though the piston remains at the top of its stroke oil will flow at all times through the ports 42 and 43 so as to cool the electrode 46. When the valve 37 is rotated so as to impress a force of two hundred pounds per square inch against the piston, then the valve 52 closes and prevents the escape of the high pressure fluid into the chamber 48.

From the foregoing it will be seen that when the device is in operation, oil is constantly flowing through the ports 42, 46 and 43 so as to cool the electrode 34 at all times. However, once during each revolution of the valve, the pressure is raised above each piston sufficiently so that the piston is reciprocated against the resistance of the spring 35.

Both of the oil pumps 41 and 50 are supplied from the reservoir 47. However, it is desirable to place an oil cooler 53 between this reservoir and the pumps to absorb the heat which is conducted away from the electrodes.

The three sleeves in each of the heads 36 are geared together and the gearing in each head is rotated in fixed relation with each other so that all of the valves operate in timed relation with each other and thus simultaneously operate the six groups of electrodes.

In order that the electrodes may be electrically connected to form the aforementioned groups, I have provided a plurality of flexible conductors 54 one of each of which is connected with a buss bar 55 which forms one of the secondary terminals of the adjacent transformer 26. Inasmuch as there are two transformers 26 disposed on each side of the machine, it has been found convenient to connect the six electrodes at one end of both the bottom and intermediate rows with one transformer, the other electrodes in both of said rows being connected to the other transformer.

The two uppermost rows of electrodes are not directly operated by reciprocating plungers, but rather, are fixedly secured in individual arms 56, these arms being pivoted to the bracket 17 so that they may swing into and out of engagement with the crank case portion of the work being welded. Suitable passageways 57 are provided in these arms whereby cooling fluid is conducted to the electrodes in the conventional manner. Each of the arms 56 is connected to a flexible conductor 58 whereby current from the two upper transformers is conducted to each group of upper electrodes.

A comparatively short piston 59 is reciprocally mounted in each of the bores 31 which comprises the two upper rows, the lower ends of these pistons bearing against the free end of the arms 56 so that downward movement of each piston 59 swings one arm and an electrode 60 which is piped therein into engagement with the work. Inasmuch as the electrodes 60 are cooled by means previously described, the pistons 59 are only provided with a single port 61 therethrough which conducts fluid from the cylinder head to the oil reservoir 47. The sleeves 37 which operate these two upper rows of pistons are each provided with ports 38 which communicate with passageways 39, identically the same as previously described in connection with pistons 32. Thus, when the valves are rotated, the pistons 59 are intermittently reciprocated by their return springs 35. The single port 61 is provided to allow the piston to return upon the closing of the valve.

In the operation of our device, the cylinder block with the two sheet metal plates is first mounted upon and clamped in the carriage 18, then the latter is reciprocated into the position corresponding to position A in Figure 4. Each of the six groups of electrodes is then simultaneously operated, the individual electrodes in each group being successively operated so that at the end of this welding cycle seventy-two spot welds secure the plates to the casting. The cylinder block is then moved successively to positions B, C, D etc. and a similar welding cycle performed at each position so as to form the six rows of overlapping spot welds, each of these welds extending the full length of the cylinder block.

Among the many advantages arising from the use of our improved method and machine, it may be well to mention that welding by this method uniformly distributes the heat of welding over the full area of the sheet to be welded thereby preventing warping either of the cylinder block casting or of the metal sheet.

Furthermore, this method prevents the expansion in the sheet metal plates from building up excessively and thus eliminates to a large degree the stresses which would otherwise be set up by the conventional seam welding methods.

A further advantage of this method is that the seam or line weld produced thereby may extend into a sharp corner or to a position at which it would be impossible to run an electrode roller. This advantage is not made use of in welding the cylinder block shown; however, other types of cylinder blocks in which the flywheel housing is cast integrally with the cylinder block may be successfully welded by the method shown; whereas, it would be impossible to run an electrode over the length of such block, due to the interference of the flywheel housing with the electrode roller.

A further advantage arises from the machine described in that a single valve controls the reciprocation of each individual electrode which valve also admits fluid which cools the electrode, thereby eliminating the many troublesome cooling connections heretofore employed for spot welding equipment. Further due to the simple construction employed the provision of a relatively large number of electrodes, seventy-two in number, does not cause the machine to become excessively costly to make or expensive to keep in repair.

Some changes may be made in the arrangement, construction, and combination of the several parts comprising our improved device, without departing from the spirit of our invention, and it is our intention to cover by our claims such changes as may reasonably be included within the scope thereof.

We claim as our invention:

1. A spot welding machine comprising, a housing having a piston reciprocally mounted therein, an electrode associated with said piston so as to be moved into engagement with the work to be welded upon reciprocation of said piston, a passageway extending through said piston from the piston head to position adjacent to said electrode, means for circulating a fluid under low pressure through said passageway to cool said electrode, retracting means urging said piston to its disengaged position with sufficient force to overcome the pressure of said cooling fluid on the piston head, and means for intermittently supplying fluid to said piston head under a sufficiently high pressure to overcome said retracting means and force said piston into its engaged position, said high pressure fluid also circulating through said passageway during the engagement movement of the piston.

2. A device, as claimed in claim 1, wherein said piston comprises a cylindrical member which is reciprocally mounted in a cylindrical bore in said housing and wherein said electrode is fixedly secured to said piston.

3. A device, as claimed in claim 1, wherein said retracting means comprises a compression spring disposed around said piston.

4. A spot welding machine comprising, a housing having a piston reciprocally mounted therein, an electrode fixedly secured to the end of said piston opposite the piston head, said electrode having a bore therein and said piston having a passageway extending lengthwise from its head through to said electrode bore, said piston having a second passageway therein extending lengthwise from the bore in said electrode and intersecting the wall of the piston at a point spaced from said piston head, means for supplying a fluid under a constant pressure to the piston head, said fluid circulating through said passageways and electrode bore to cool same, retracting means urging the piston and electrode away from the work to be welded with sufficient force to overcome the pressure exerted by said fluid on the piston head, and means for intermittently supplying fluid to said piston head under a sufficiently high pressure to overcome said retracting means and move the piston into its engaged position, said high pressure fluid also circulating through said cooling passageway during the engagement movement of said piston.

5. A device, as claimed in claim 4, wherein a check valve is provided in the low pressure fluid supplying means, said check valve preventing the high pressure fluid from discharging in a reverse direction through the low pressure supply means.

6. A welding machine adapted to produce a line weld comprising, a frame having a plurality of groups of electrodes mounted therein so as to be individually operatively moved into engagement with the work to be welded, the electrodes in each of said groups being spaced from each other along the line of the weld, welding transformers each of which is adapted to supply welding current to all electrodes in one of said groups, cyclic means for successively moving the individual electrodes in each of said groups into engagement with the work to be welded so as to produce a plurality of spot welds, the several groups of electrodes being simultaneously so operated, and means for shifting the work to be welded a distance equal to substantially one half the diameter of the spot welds during the interval between each of said welding cycles to thus produce a line weld composed of overlapping spot welds.

7. A welding machine adapted to form a line weld comprising, a frame, a plurality of electrodes mounted for individual movement upon said frame, said electrodes being spaced along the line to be welded a distance apart greater than the length of the weld produced in one of said electrodes, cyclic means for successively bringing said electrodes into contact with the work to be welded, and means for shifting said work relative to said electrodes in the interval between each welding cycle, said shifting being in a direction along the line of the weld and being sufficient to cause the welds produced by one cycle of the machine to overlap the welds produced by a former cycle.

CHAS. E. SORENSEN.
WILLIAM F. PIOCH.